Oct. 10, 1961   F. K. H. NALLINGER   3,003,575
PNEUMATIC AND EQUALIZED MECHANICAL SPRING
SUSPENSION FOR HALF AXLES
Filed March 25, 1958
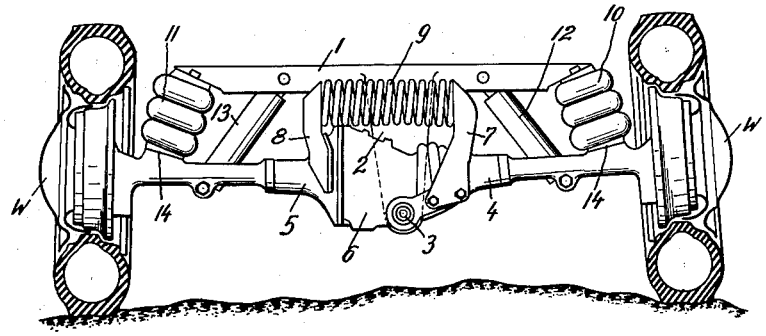
Inventor
FRIEDRICH K. H. NALLINGER
BY Dicke and Craig
ATTORNEYS United States Patent Office 3,003,575
Patented Oct. 10, 1961

3,003,575
PNEUMATIC AND EQUALIZED MECHANICAL
SPRING SUSPENSION FOR HALF AXLES
Friedrich K. H. Nallinger, Stuttgart-N, Germany, assignor to Daimler-Benz Aktiengesellschaft, Stuttgart-Unterturkheim, Germany
Filed Mar. 25, 1958, Ser. No. 723,827
Claims priority, application Germany Mar. 30, 1957
1 Claim. (Cl. 180—73)

My invention relates to an improved spring system for vehicles, more particularly motor vehicles, and it is its primary object to improve the riding qualities of the vehicle by the provision of pneumatic springs and to reduce the dimensions of such pneumatic springs by relieving them of part of the load of the vehicle. Viewed from another aspect of my invention, it is the object thereof to provide an effective spring system which is simple and reliable in operation, lends itself to manufacture at a low cost and imparts superior riding qualities to the vehicle.

Further objects of my invention will appear from a detailed description of a preferred embodiment thereof following hereinafter with reference to the drawings. I wish it to be understood, however, that my invention is in no way limited to the details of such embodiment but is capable of numerous modifications within the scope of the appended claims and that the terms and phrases used in such detailed description have been chosen for the purpose of illustrating the invention rather than that of restricting or limiting same.

In the drawing I have shown a rear view of a motor vehicle chassis showing the driven rear wheels thereof and the improved spring system associated therewith, the tires of the wheels being shown in section.

The frame that may be an integral part of the body of the vehicle includes a transverse beam 1 and a bracket 2 fixed thereto and depending from the central portion thereof. The lower end of this bracket carries coaxial pivotal bearings for a pair of half axles 4 and 5 mounted for oscillation about an axis 3 extending fore and aft. The half axle 5 is rigidly connected with a housing 6 encasing the rear axle transmission including the differential gears. Hence, both the half axle 5 and the casing 6 will swing about the axis 3 in unison. An arm 7 is fixed to the half axle 4 and extends upwardly therefrom. Similarly, an arm 8 is fixed to the half axle 5 and extends upwardly therefrom. A helical spring 9 is provided to connect the arms 7 and 8. More particularly, these arms extend upwardly, generally perpendicular to the respective axles, and the helical spring 9 is a pressure spring held in compression between the arms above the housing 6 and the pivotal axis 3 and extending generally horizontally or parallel to the axles 4 and 5.

On the outside of the arms 7 and 8 pneumatic springs formed by bellows 10 and 11 are interposed between the half axles 4 and 5 and spring supports fixed to the ends of the transverse beam 1. These bellows rest on the half axles and, for this purpose, the latter may be provided with spring seats 14 for the bellows which may be inwardly inclined, as shown.

Moreover, shock absorbers of the telescope type are interposed between the frame 1 and the half axles 4 and 5 and are pivotally connected thereto. Wheels W are rotatably mounted on the ends of the half axles 4 and 5.

From the foregoing it will appear that the pair of opposite wheels W are mounted for up-and-down movement relative to the frame by the bracket 2 and the half axles 4 and 5. The pneumatic springs formed by the bellows 10 and 11 are individually associated with the wheels W, each pneumatic spring being responsive to its associated wheel only. Therefore, up-and-down movement of one wheel will not affect the bellows associated with the other wheel. The additional flexible springing means constituted by the helical spring 9, however, is associated with both of the wheels through the intermediary of the half axles and is exclusively responsive to the geometric sum of the movements of both wheels. This will readily appear from a consideration of what happens when one wheel moves upwardly and the other wheel moves downwardly the same distance thus reducing the geometric sum of the movements of both wheels to zero. In this event the half axles will swing about the axis 3 in the same angular direction through the same angle holding their arms 7 and 8 in unchanged spaced relationship. As a consequence, the spring 9 will be neither expanded nor compressed or, in other words, will not respond to the movements of the wheels.

If one of the wheels, however, for instance the wheel W carried by the half axle 4, moves upwardly when rolling over an obstruction, the arm 7 will compress the spring 9. At the same time the air will be compressed in the bellows 10. As a result, the reactionary force exerted by the road surface upon the wheel W will be transferred to the frame by both, the pneumatic spring 10 and the flexible spring 9, the latter enabling the half axles 4 and 5 to exert an upwardly directed force upon the bracket 2 supporting part of the weight of the vehicle.

The spring system described has numerous advantages. This will be readily understood from a consideration of the effect of the pneumatic bellows. If the entire load to be carried by one of the wheels W would be transferred by a single pneumatic spring, same would require very large dimensions. My improved spring system, however, makes it possible to considerably reduce the dimensions of the pneumatic spring as each wheel is sprung by both, the pneumatic spring and the mechanical spring 9. The pneumatic spring, however, has a particularly favorable spring characteristic because of the progressive effect thereof. The additional mechanical spring 9 is utilized at the same time to obtain an equalizing effect between the two wheels. Hence, the mechanical spring has the dual function of serving as an additional spring permitting it to reduce the dimensions of the pneumatic spring and to equalize the spring forces, thereby improving the riding qualities of the vehicle.

The improved effect of my novel spring system may be also understood by a consideration of the effect of the equalizing spring 9. Any equalizing spring requires the provision of an additional stabilizer spring. In the absence of such stabilizer spring interposed between the wheels and the frame of the vehicle, no restoring couple would be exerted upon the frame or body of the vehicle. This restoring couple must be effected by additional stabilizer springs. In my improved system such stabilizer springs are formed by the pneumatic springs having a progressive spring characteristic and being, therefore, particularly effective in rapidly returning the body to its central position of equilibrium. Nevertheless, the pneumatic springs have a very soft spring characteristic for medium loads.

It is a feature of particular utility of the embodiment shown that the axis 3 is common to both of the half axles. This has the effect of resulting in smaller angular displacements of the arms 7 and 8 than obtainable with half axles having spaced pivotal axes disposed on both sides of the vertical central longitudinal plane of the vehicle.

While the invention has been described in connection with a preferred embodiment thereof, it will be understood that it is capable of further modification, and this application is intended to cover any variations, uses, or adaptations of the invention following, in general, the principles of the invention and including such departures

What I claim is:

In a motor vehicle, the combination comprising frame means, said frame means including a transverse beam member, a pair of half axles, means for pivotally supporting said half axles on said transverse beam member for oscillation individually about only one axis extending essentially fore and aft, resilient connecting means between said transverse beam member and said half axles comprising two pneumatic spring bellows, one each of said two bellows being respectively associated with a respective one of said half axles, said transverse beam member terminating in seating means for one end of each said bellows, said seating means being outwardly and downwardly inclined relative to said transverse beam member, each of said half axles comprising seating means for the other end of each of said bellows, said last-named seating means facing upwardly and being inclined angularly to the axis of a respective half axle, the bellows of one half axle being operative independently of the bellows of the other half axle and providing each a progressive spring characteristic in response to oscillation of the respective half axle, one spring abutment for each half axle, each spring abutment being secured to a respective half axle for oscillating movement therewith, and a mechanical spring responsive exclusively to the geometric sum of the movements of the half axles and operatively connected between said spring abutments to serve simultaneously as equalizing spring and as auxiliary spring to aid said two pneumatic spring bellows in case of spring movements of said half axles producing a resultant geometric sum, shock absorbers having lower ends connected to said half axles intermediate said seating means on said half axles and having upper ends connected to said transverse beam member intermediate said seating means on said transverse beam member, said lower ends being spaced apart a greater distance than the distance between said upper ends, and a rear axle transmission housing between said half axles, said mechanical spring being a compression spring and disposed above said housing.

References Cited in the file of this patent

UNITED STATES PATENTS

| | | |
|---|---|---|
| 2,105,369 | Paton | Jan. 11, 1938 |
| 2,257,913 | Maranville | Oct. 7, 1941 |
| 2,419,104 | Wilfert | Apr. 15, 1947 |
| 2,818,128 | Uhlenhaut | Dec. 31, 1957 |
| 2,934,352 | Polhemus | Apr. 26, 1960 |

FOREIGN PATENTS

| | | |
|---|---|---|
| 704,270 | Great Britain | Feb. 17, 1954 |
| 178,394 | Switzerland | Sept. 16, 1935 |